(12) United States Patent
Decorme et al.

(10) Patent No.: US 8,287,022 B2
(45) Date of Patent: Oct. 16, 2012

(54) REAR MASKING DEVICE FOR A MOTOR VEHICLE, AND ASSOCIATED REAR ASSEMBLY

(75) Inventors: Jacques Decorme, Montcy Notre Dame (FR); Franck Jeunehomme, Montherme (FR)

(73) Assignee: Faurecia Automotive Industrie, Nanterre (FR)

( * ) Notice: Subject to any disclaimer, the term of this patent is extended or adjusted under 35 U.S.C. 154(b) by 442 days.

(21) Appl. No.: 12/618,217

(22) Filed: Nov. 13, 2009

(65) Prior Publication Data

US 2010/0127526 A1 May 27, 2010

(30) Foreign Application Priority Data

Nov. 14, 2008 (FR) ...................................... 08 57765

(51) Int. Cl.
*B60P 7/02* (2006.01)
(52) U.S. Cl. ................ 296/24.44; 296/24.43; 296/37.16
(58) Field of Classification Search .................. 296/24.4, 296/24.43, 24.44, 37.8, 37.16
See application file for complete search history.

(56) References Cited

U.S. PATENT DOCUMENTS

| 5,970,884 | A * | 10/1999 | Taille et al. ..................... 108/44 |
| 6,394,002 | B1 * | 5/2002 | Blanchard et al. .............. 108/44 |
| 6,508,499 | B1 * | 1/2003 | Guanzon et al. ............. 296/37.1 |
| 6,742,823 | B2 * | 6/2004 | Guanzon et al. ........... 296/37.16 |
| 6,983,971 | B2 * | 1/2006 | Broadhead et al. ........ 296/24.44 |
| 7,281,742 | B2 * | 10/2007 | Porter et al. .................. 296/24.4 |
| 2003/0116989 | A1 * | 6/2003 | Guanzon et al. ............ 296/37.16 |
| 2003/0222475 | A1 * | 12/2003 | Nakamitsu et al. ........ 296/37.16 |
| 2010/0127526 | A1 * | 5/2010 | Decorme et al. ........... 296/37.16 |

FOREIGN PATENT DOCUMENTS

| EP | 2 850 917 | 8/2004 |
| EP | 1 452 393 | 9/2004 |
| EP | 1 880 902 | 1/2008 |
| JP | 2008247167 | * 10/2008 |
| JP | 2010116151 | * 5/2010 |

OTHER PUBLICATIONS

French Search Report dated Jun. 25, 2009, from corresponding French application.

* cited by examiner

*Primary Examiner* — Glenn Dayoan
*Assistant Examiner* — Gregory Blankenship
(74) *Attorney, Agent, or Firm* — Young & Thompson (57) ABSTRACT

The device includes supports (30), a shelf (32) rotatably mounted about a transverse axis (B-B') and a mechanism (34) for articulation of the shelf (32) relative to the supports (30). The mechanism (34) includes an abutment surface (76) delimited by the shelf (32) and a complementary abutment surface (90) delimited by the support (30), which are intended to slide on each other during the pivoting of the shelf (32) about its transverse axis (B-B') in order to prevent radial movement of the shelf (32) towards the front with respect to the transverse axis (B-B'). The mechanism (34) includes a retaining surface (82) integral with the shelf (32) and a complementary retaining surface (96) defined by each support (30) which co-operate for each inclined position of the shelf (32) in order to prevent radial movement of the shelf (32) towards the rear with respect to the transverse axis (B-B').

17 Claims, 4 Drawing Sheets

REAR MASKING DEVICE FOR A MOTOR VEHICLE, AND ASSOCIATED REAR ASSEMBLY

The present invention concerns a rear masking device for a motor vehicle, of the type comprising,
- supports intended to be integral with the sides of the motor vehicle;
- a shelf mounted to be rotatable about a transverse axis in the supports between a substantially horizontal position disposed so as to bear on the supports and an inclined limit of travel position;
- a mechanism for articulation of the shelf relative to the supports comprising, for each support, at least one abutment surface delimited by the shelf and a complementary abutment surface delimited by the support, the abutment surface and the complementary abutment surface being intended to slide on each other during the pivoting of the shelf about its transverse axis in order to prevent radial displacement of the shelf in a forward direction with respect to the transverse axis, the abutment surface and the complementary abutment surface being located radially at a first distance from the transverse axis,
- the mechanism for articulation of the shelf comprising a retaining surface integral with the shelf and a complementary retaining surface defined by each support, the retaining surface and the complementary retaining surface being located radially at a second distance from the transverse axis which is greater than the first distance.

Such a device comprises a shelf articulated transversely between the sides of the motor vehicle in order to separate the boot into a lower compartment, in which objects present in the boot are masked by the shelf, and an upper compartment in which the objects may be carried on the shelf.

During the opening of the boot, the shelf may be inclined relative to its horizontal rest position bearing on the supports, either by manual action on the part of the user, or by cords connecting the shelf to the tailgate.

In order to mount a shelf of this type in the sides of the vehicle, it is known to use an articulation mechanism comprising transverse pins added on either side of the shelf about its axis of rotation. The pins are inserted into complementary cylindrical seats provided in the sides of the vehicle. Such a shelf is expensive to manufacture.

In order to remedy this problem, FR 2 850 917 proposes a shelf devoid of pins passing through its axis of rotation. The shelf comprises laterally a first abutment surface co-operating with a complementary abutment surface integral with the supports during the pivoting of the shelf.

The shelf further comprises a retaining surface co-operating, at the limit of travel of the shelf, with a complementary retaining surface.

The shelf is inserted into the supports by inclining it with respect to its horizontal position.

Then, when a tensile force directed at least partially towards the front of the vehicle is exerted, the shelf pivots to its inclined limit of travel position. The shelf is actuated manually.

Such a shelf is therefore satisfactory when the actuating force for the shelf is continuously directed towards the front of the motor vehicle.

However, when the shelf is operated manually to bring it from its horizontal position to its inclined limit of travel position, there is a great risk that it will come out of its supports, for example when the user pulls the shelf backwards while lifting it up.

If the user closes the tailgate again without checking the correct positioning of the shelf, the latter may be broken.

It is therefore an aim of the invention to create a rear masking device which is inexpensive and adaptable to different types of motor vehicles, the shelf being pivotable about its axis without a major risk of it coming out of the supports, for example when the user pulls the shelf rearwards while lifting it.

If the user closes the tailgate again without checking the correct positioning of the shelf, the latter may be broken.

To this end, the subject of the invention is a device of the aforesaid type, characterized in that the retaining surface and the complementary retaining surface co-operate for each inclined position of the shelf between its substantially horizontal position and its inclined limit of travel position in order to prevent the radial movement of the shelf towards the rear with respect to the transverse axis.

The device according to the invention may comprise one or more of the following features, taken singly or in any technically possible combination:
- in the substantially horizontal position, the retaining surface is disposed at a distance from the complementary retaining surface to permit radial movement of the shelf towards the rear between a position engaged in each support and a disengaged position away from the supports;
- the shelf delimits a guide surface, having a curvature centred on the transverse axis, each support having a complementary guide surface having a shape complementary to the guide surface, the guide surface and the complementary guide surface being located radially relative to the transverse axis between the complementary abutment surface and the complementary retaining surface in at least one inclined position of the shelf between its horizontal position and its inclined limit of travel position;
- the mechanism for articulation of the shelf comprises, for each support, a retaining projection integral with the shelf, delimiting the retaining surface, the retaining projection being received in a slide delimited by each support, the slide defining the complementary retaining surface;
- each support delimits a pivot wall defining the complementary abutment surface and a guide wall defining the complementary retaining surface, the guide wall and the pivot wall delimiting between them a substantially horizontal passage for the insertion of the projection into the slide;
- the retaining surfaced delimited on the projection and the abutment surface extend substantially opposite each other and define between them a notch passing through the shelf perpendicularly to the pivot axis, the guide wall being received in the notch during the pivoting of the shelf into each inclined position between its horizontal position and its inclined limit of travel position;
- the guide wall is resiliently deformable in the slide between a configuration for insertion of the shelf into the articulation mechanism and a configuration for holding the shelf in the articulation mechanism;
- the projection, opposite from the retaining surface, delimits a locking protuberance intended to come into contact, in at least one given position between the horizontal position and the inclined limit of travel position, with a surface defining the slide, in order to retain the shelf in the given position; and
- the projection delimits a lower surface located opposite to the retaining surface inclined by a non-zero angle of less than 90° relative to a median plane of the shelf, the median plane being substantially horizontal in the horizontal position of the shelf.

The invention also has as its subject a rear assembly for a motor vehicle, characterized in that it comprises:

lateral sides delimiting a boot;

a movable tailgate intended to close off the boot towards the rear;

a masking device as defined above, the supports being integral with the lateral sides of the motor vehicle.

The assembly according to the invention may comprise the following feature:

the tailgate is mounted to pivot about a transverse tailgate axis relative to the sides between a position in which the boot is closed off and a position for access to the boot, at least one cord connecting the tailgate to the shelf in order to pivot it between its horizontal position and its inclined limit of travel position during the opening of the tailgate, the or each cord(s) exerting over at least a part of the travel of the tailgate a force comprising a rearwardly directed component.

The invention will become clearer from the following description, provided solely by way of example and with reference to the appended drawings, wherein.

Throughout the following, the orientations are the customary orientations of a motor vehicle. Thus, the terms "rear", "front", "upper", "lower", "outer", "inner", "longitudinal", "transverse", "left", and "right" are to be understood as in relation to the normal direction of travel of the motor vehicle and to the position of a driver.

A first rear assembly 10 for a motor vehicle is illustrated in FIGS. 1 to 4.

Figure 1:
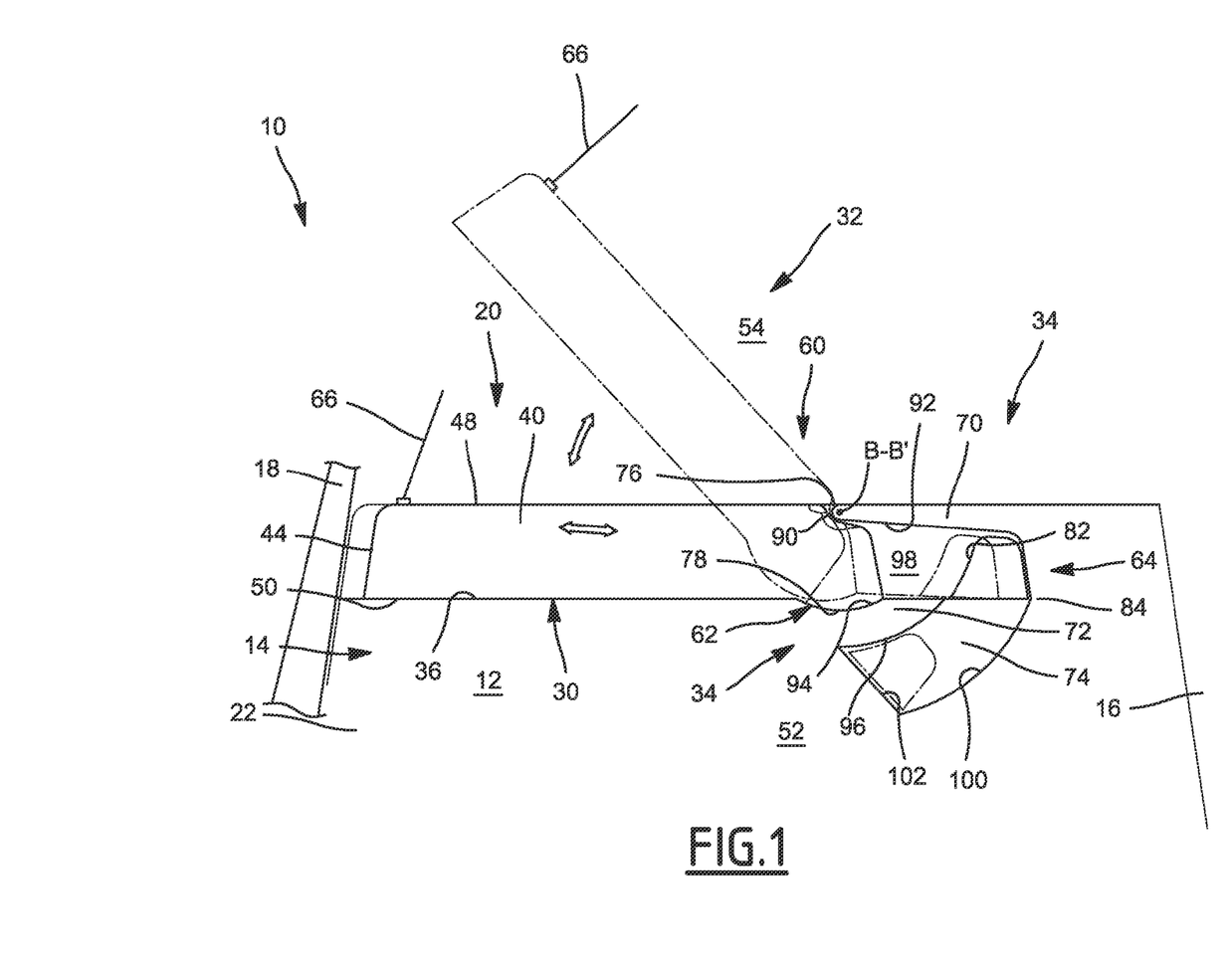
FIG. 1 is a view in section in a longitudinal vertical plane of the relevant parts of a first rear assembly for a motor vehicle in which the shelf is pivoted by means of cords.

The rear assembly 10 defines a boot 12 of the motor vehicle. It comprises a floor (not shown) which delimits the boot 12 in a downward direction, lateral sides 14, of which only the left-hand side is shown in FIG. 1, and which delimit the boot 12 laterally to the left and right, and at least one seat 16 of the vehicle which delimits the boot 12 in a forward direction.

The rear assembly 10 further comprises a movable tailgate 18 intended to close off the boot 12 towards the rear and towards the top.

The rear assembly 10 also comprises a first masking device 20 according to the invention, which will be described in detail below.

The sides 14 extend into the passenger compartment of the motor vehicle, on either side of the boot 12. Each side 14 comprises a substantially vertical wall 22 delimiting the boot 12 laterally.

The tailgate 18 is articulated on the roof (not shown) of the vehicle along its upper edge, about a transverse tailgate axis.

It is movable in rotation between a position for closing off the boot 12, in which it extends to the rear of the sides 14 in contact with the sides 14, and an open position for access to the boot, in which it has been pivoted upwards and towards the front.

Figure 2:
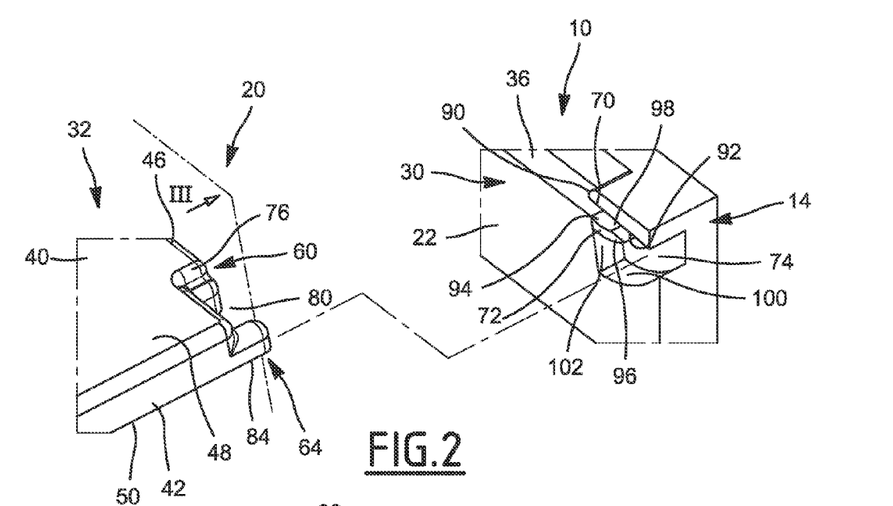
FIG. 2 is a partial perspective three-quarter front view, in partial section, of the assembly of FIG. 1, the shelf having been withdrawn from the supports.

The masking device 20, with reference to FIGS. 1 and 2, comprises supports 30 respectively integral with each side 14, a shelf 32 for supporting objects and intended to compartmentalise the boot 12 in order to separate it into two compartments, and a mechanism 34 for articulation of the shelf 32 in the supports 30.

The supports 30, in this example, comprise substantially horizontal flat supports 36, delimited by each of the sides 14, on either side of the shelf 32.

In this example, the flat supports 36 are located along the upper edge of the vertical wall 22 and extend over a part of the length of the shelf 32 located preferably at the rear. As a variant, they extend over the whole length of the shelf 32.

Each flat support 36 delimits an upper support surface for the shelf 32 when the shelf 32 is in a horizontal rest position.

Each flat support 36 is formed by a longitudinal step provided along the upper edge of the vertical wall 22, as illustrated in FIG. 2.

The shelf 32 comprises a shelf body 40 extending substantially in a median plane of the shelf. It has a generally rectangular cross-section viewed in its median plane.

The body 40 extends between a front edge 42 located in the region of the rear seats 16, and a rear edge 44 intended to be placed in the region of the tailgate 18 when the tailgate 18 closes off the boot 12.

The body 40 further extends transversely over the whole width of the boot 12 between the flat support 36 of the left-hand side 14 and the flat support of the right-hand side (not shown).

The width of the shelf 32, viewed between the left-hand edge 46 and the right-hand edge is greater than the distance separating the respective flat supports 36 opposite each side 14.

The body of the shelf 40 is advantageously made of thermoplastic material optionally reinforced with fibres or metal and may be covered with a textile such as moquette, a non-woven or a woven fabric. It has an upper surface 48 on which may be placed objects having a mass greater than several dozen grams without significant deformation of the shelf.

The body 40 also has a lower surface 50 intended to bear on the flat supports 36 along the left-hand edge 46 and the right-hand edge.

As will be seen hereinafter, the shelf 32 is mounted to be movable in rotation relative to the supports 30 by means of the articulation mechanism 34 about a fixed transverse articulation axis B-B', between a substantially horizontal rest position, a plurality of intermediate inclined positions, and an inclined limit of travel position which is shown by dotted lines in FIG. 1.

As will be seen hereinafter, the shelf 32 is also movable from its horizontal rest position between a configuration engaged in the supports 30 and in the articulation mechanism 34, and a configuration disengaged from the mechanism 34 and away from the supports 30, in which the shelf 32 can be removed from the boot 12.

As will be seen hereinafter, the shelf 32 can be disengaged from the mechanism 34 away from the supports only in its horizontal position. In each inclined position, the shelf 32 is retained in the supports 30 by the mechanism 34.

Figure 3:
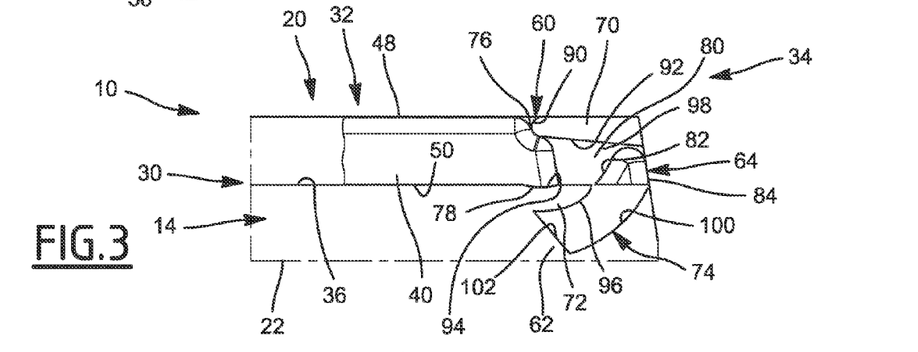
FIG. 3 is a side view in partial section along the longitudinal vertical plane III of FIG. 2, the shelf being in its horizontal rest position bearing on the supports.

In the horizontal position, the shelf 32 is disposed so as to bear on the flat supports 36.

It extends over the whole width of the vehicle between the sides 14. It delimits in the boot 12 a lower compartment 52 for storing objects and masked in an upward direction by the shelf 32, and an upper compartment 54 visible from the outside of the vehicle through a window of the tailgate 18.

Figure 4:
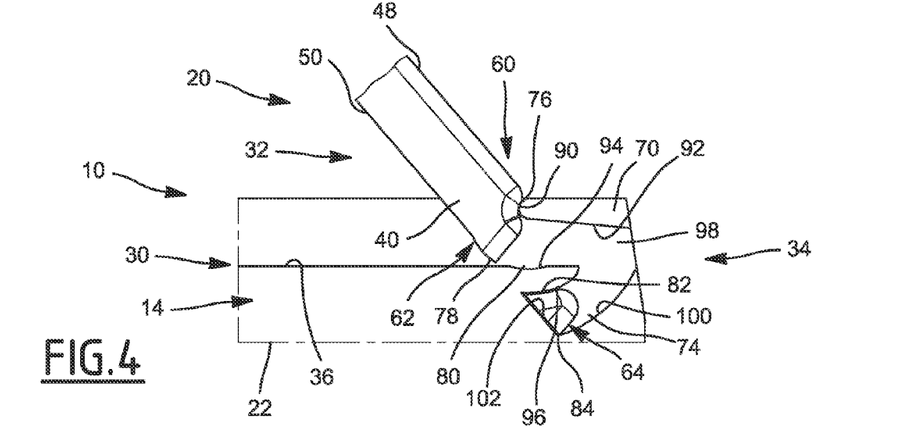
FIG. 4 is a view similar to FIG. 3 in an inclined intermediate position of the shelf.

In each intermediate position, between the horizontal position and the inclined limit of travel position, the shelf 32 has pivoted about the transverse axis B-B' by movement of its rear edge 44 upwards and towards the front. The shelf 32 is locked in a radial position about the axis B-B' by the articulation mechanism 34, as will be described hereinafter.

According to the invention, the shelf 32 is devoid of pivots passing through its axis of rotation B-B'. The mechanism 34 for articulation of the shelf 32 on the supports 30 comprises, in each front corner of the shelf 32, an upper step 60 for pivoting of the shelf, a lower guide boss 62, and a transverse projection 64 for retaining the shelf in each inclined position, and which is disposed at the front and away from the step 60 and the boss 62.

The mechanism 34 further comprises, for each support 30, a pivot wall 70 intended to co-operate with the facing step 60, a guide wall 72 intended to receive the boss 62, and a slide 74 for retaining the projection 64.

Throughout the following, only the part of the mechanism 34 present in the left front corner of the shelf 32, and in the facing left-hand support 30 are described. The corresponding part of the mechanism 34 present in the right front corner and in the right-hand support is of symmetrical structure and is not described.

In this example, the step 60, the boss 62 and the projection 64 are made in one piece with the body 40 of the shelf 34 in order to facilitate the production of the shelf 32 and to reduce its cost.

The step 60 has a forward-facing concavity. It is formed in the upper surface of the body 40 in the region of the lateral edge 46, to the rear of the front edge 42. It defines an upper abutment surface 76 on the wall 70.

The abutment surface 76 has a forward-facing concavity. It has a cross-section, viewed in a longitudinal vertical plane, substantially in the shape of an arc of a circle.

The abutment surface 76 extends perpendicularly to the lateral edge 46 over a width of less than 10% of the width of the shelf 32, viewed between its lateral edges 46.

The lower boss 62 is formed beneath the body 40 of the shelf below the upper abutment surface 76. It delimits a guide surface 78, having a downward-facing convexity with a curvature centred on the axis B-B' when the shelf 32 is in each inclined position.

The projection 64 projects transversely with respect to the body 40 in transverse prolongation of the front edge 42. It extends opposite the step 60.

The projection 64, with the step 60, delimits a notch 80 with transverse axis passing vertically through the body 40 of the shelf and opening out laterally towards the outside opposite the supports 30. The width of the notch 80 is greater than the thickness of the guide wall 72.

The projection 64 delimits, opposite the notch 80, a concave rear surface 82 for retaining the shelf when the projection 64 is engaged in the slide 74. The retaining surface 82 has a cross-section having a curvature centred on the axis B-B', viewed in a longitudinal vertical plane.

In each inclined position of the shelf 32, the radial distance $d_2$ which separates the axis B-B' from the retaining surface 82 is greater than the radial distance $d_1$ which separates the axis B-B' from the abutment surface 76 delimited by the step 60.

The radial distance $d_3$ which separates the guide surface 78 from the axis B-B' is between the radial distance $d_1$ and the radial distance $d_2$.

The projection 64 further delimits along its front edge a front ridge 84.

In this example, the projection 64 extends transversely as far as a free end located substantially in the same plane perpendicular to the axis B-B' as the lateral edge 46 in the region of the step 60. It has a substantially trapezoidal cross-section in a longitudinal vertical plane.

The pivot wall 70 extends substantially horizontally. It is located above and away from the upper surface of the flat support 36.

The pivot wall 70 has a complementary abutment surface 90 which extends transversely along its rear edge, and a lower surface 92 which extends opposite the guide wall 72.

The complementary abutment surface 90 has a width substantially equal to the width of the abutment surface of the step 60. It has a curvature, viewed in a longitudinal plane perpendicular to the axis B-B', which is centred on the axis B-B' and has a shape complementary to the curvature of the abutment surface 76. It thus has a rearwardly directed convexity.

The lower surface 92 of the pivot wall 70 has a slight inclination directed downwards and towards the front in relation to a horizontal plane. It extends at the rear, opposite the guide wall 72, and at the front, opposite the slide 74. As a variant, the lower surface 92 is horizontal.

The guide wall 72 projects substantially horizontally forwards from the flat support 36. It has a complementary guide surface 94 for the rotation of the shelf 30, having a shape complementary to the guide surface 78 delimited by the boss 62, and a complementary retaining surface 96 for the shelf, having a shape complementary to the retaining surface 92 of the projection 64.

The complementary guide surface 94 delimits a recess open in an upward direction, having a shape complementary to the boss 62.

The guide wall 72 is slightly deformable downwards in the slide 74 during the insertion of the shelf 32 between its disengaged position and its position engaged in the mechanism 34, between a deformed configuration for insertion of the shelf 32 and a rest and retaining configuration for the shelf 32. As a variant, the shelf 32 is itself flexible with respect to its median plane in order to facilitate its insertion into the mechanism 34.

The complementary guide surface 94 has in its recess a curvature centred on the axis B-B'. It is located radially in relation to the axis B-B' at a distance $d_3$ which is between the distance $d_1$ separating the axis B-B' from the complementary abutment surface 90 and the distance $d_2$ separating the axis B-B' from the complementary retaining surface 96.

When the shelf 32 is engaged in the mechanism 34 and is in its horizontal position, the abutment surface 76 fits against the complementary abutment surface 90. Similarly, the guide surface 78 fits against the complementary guide surface 94 of the wall 72.

In addition, the lower surface 92 of the pivot wall, and the complementary guide surface 94, delimit between them a passage 98 for the insertion of the projection 64 into the slide 74. The passage 98 opens towards the rear beneath the complementary abutment surface 90 opposite the support 36. It opens downwards at the front into the slide 74. The passage 98 extends substantially horizontally.

The maximum height of the passage 98 is greater than the height of the projection 64 when the shelf 32 is in its horizontal position. Thus, the projection 64 can be moved freely in translation in the passage 98 during the passage of the shelf 32 from its engaged configuration to its disengaged configuration.

The complementary retaining surface 96 has a convexity directed downwards and towards the front.

The slide 74 has a general shape curved downwards and towards the rear. It extends between the complementary retaining surface 96 and a convex surface 100, having a curvature centred on the axis B-B'. The convex surface 100 is located radially away from the complementary retaining surface 96.

The distance which separates the complementary surface 96 radially from the convex surface 100 is substantially equal to the distance which separates the retaining surface 82 radially from the front ridge 84 on the projection 64, when the latter is engaged in the slide 74. Thus, the ridge 84 remains substantially in the region of the convex surface 100 during the movement of the projection 64 in the slide 74.

The slide 74 opens out in an upward direction at the front into the passage 98. It is closed off towards the rear by a rear limit of travel surface 102.

The rear surface 102 is configured such that, when the projection 64 comes into contact with the rear surface 102, the shelf is inclined at an angle of more than 30° and, for example, of between 0° and 50° with respect to a horizontal plane.

The slide 74 thus extends over an angular range of around 50° about the axis B-B', viewed between the passage 98 and the rear surface 102.

During the pivoting of the shelf 32 about the axis B-B', the rear retaining surface 96 of the projection 64 slides along the complementary retaining surface 96 until the projection 64 comes into contact with the rear limit of travel surface 102. The shelf 32 is then in its inclined limit of travel position.

Each cord 66 is fixed onto the shelf 32 at a first fixing point located in the region of the rear edge 44 of the shelf and is fixed at a second fixing point on the tailgate 18 (not shown). The cords 66 are suitable for exerting on the shelf 32 a force directed upwards and towards the rear or the front, according to the configuration of the tailgate 18, when the tailgate 18 passes from its position closing off the boot 12 to its position in which the boot is open.

The fitting and operation of the first rear assembly 10 according to the invention will now be described.

Initially, the shelf 32 is positioned outside the boot 12 away from the supports 30. The shelf 32 is disengaged from the articulation mechanism 34.

In this position, each projection 64 is located out of the insertion passage 98 and out of each slide 74.

When a user wishes to fit the shelf 32 in the boot, he places the tailgate 18 in its open position. Then he places the shelf 32 horizontally on the supports 36. He then slides the shelf 32 towards the front and engages each projection 64 in an insertion passage 98 between the guide wall 72 and the pivot wall 70.

During this movement, the guide wall 72 deforms slightly to allow the boss 62 to pass between the pivot wall 70 and the guide wall 72 and to bring the guide surface 78 into the recess delimited by the complementary guide surface 94. The guide wall 72 passes from its rest configuration to its deformed configuration, then from its deformed configuration to its rest configuration when the boss 62 is received in the recess defined by the guide wall 72.

The upper abutment surface 76 delimited by the step is then in contact with the complementary abutment surface 90 on the pivot wall 70.

The shelf 32 is in its horizontal rest position bearing on the supports 36 along its lateral edges 46. It is held along a longitudinal axis C-C' relative to the supports 30 by co-operation between the boss 62 and the recess provided in the guide wall 72.

The tailgate 18 can then be closed again to wedge the rear edge 44 of the shelf 32 in translation along the longitudinal axis C-C' of the vehicle.

The shelf 32 then masks the lower compartment 52 and makes it possible to support objects in the upper compartment 54.

When a user wishes to gain access to the boot 12, he brings the tailgate 18 from its position in which the boot 12 is closed off to its position for access to the boot 12.

During this movement, the cords 66 exert in the region of the rear edge 44 of the shelf a force directed upwards and towards the rear or the front in order to bring the shelf 32 from its horizontal position to at least one inclined position.

The projection 64 then engages in the slide 74. The guide wall 72 penetrates into the notch 80 and the front edge 42 of the shelf 32 descends into the lower compartment 52, below the supports 36.

During this passage, the abutment surface 76 slides about the complementary abutment surface 90, thus preventing radial movement of the abutment surface 76 and of the shelf 32 in a forward direction relative to the axis B-B'. The axis B-B' for rotation of the shelf 32 therefore remains fixed in relation to the supports 30.

In addition, the projection 64 moves in the slide 74 and the retaining surface 82 comes into contact with the complementary retaining surface 96, in order to slide on the surface 96.

The co-operation between the retaining surface 82 and the complementary retaining surface 96 blocks the radial movement of the shelf 32 and of the abutment surface 76 towards the rear with respect to the axis B-B', thereby preventing the disengagement of the shelf 32 from its articulation mechanism 34, even if the tensile force exerted by the cords 66 is directed towards the rear. This occurs for each inclined position of the shelf 32.

As a result, as soon as the shelf 32 leaves its horizontal rest position in which it is engaged in the mechanism 34, its withdrawal from the mechanism 34 is prevented and its guiding in rotation is effected both by the co-operation between the upper abutment surface 76 defined on the shelf 32 and the complementary abutment surface 90 defined on each support 30, and by the co-operation between the retaining surface 82 defined on the shelf 32 and the complementary retaining surface 96 defined on each support 30.

Thus, each point of the shelf 32 remains substantially at a constant distance from the axis B-B' during the pivoting of the shelf 32 about the axis B-B', for each inclined position of the shelf.

In addition, the rounded configuration of the guide surface 78 defined beneath the shelf 32 which slides on the complementary guide surface 94 defined by each support 30 at least at the start of travel of the shelf 32 between its horizontal position and its inclined limit of travel position, prevents jamming of the shelf 32 and facilitates its rotation.

In order to withdraw the shelf 32 again from the supports 30 and disengage it from the mechanism 34, the shelf 32 is tilted again into its horizontal position.

Figure 5:
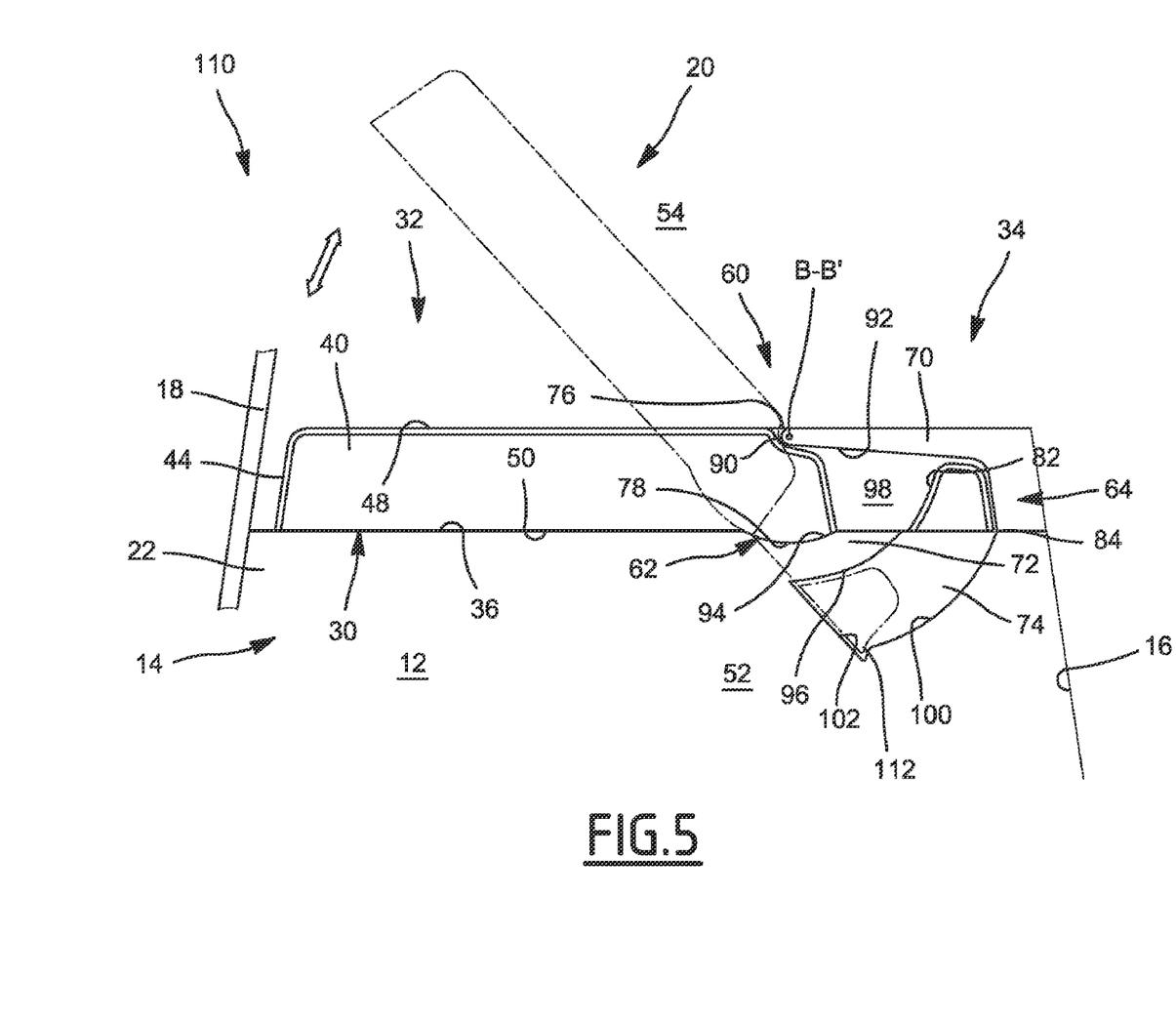
FIG. 5 is a view similar to FIG. 1 of a second rear assembly according to the invention in which the shelf is pivoted manually.

In a variant of the masking device 110, shown in FIG. 5, the shelf 32 is movable independently of the tailgate 18. No cord 66 connects the shelf to the tailgate 18.

In this case, the shelf 32 may be tilted manually by a user between its horizontal position, each intermediate inclined position, and its inclined limit of travel position.

In another variant also shown in FIG. 5, the convex surface 100 defines, in the region of the rear limit of travel surface 102, a seat for insertion of the ridge 84, intended to receive the ridge 84 in order to provide reversible immobilisation of the shelf 32 in its inclined limit of travel position, without it being necessary to exert a retaining force manually in an upward direction.

In another variant, not shown, the shelf 32 comprises a storage drawer inserted into the body 40 and extendably deployable with respect to the body 40.

By means of the invention described above, it is possible to have available a masking device 20 for a motor vehicle which is simple to fit in a vehicle and which nevertheless has sufficient mechanical strength in the vehicle, both when the shelf 32 is in its horizontal position and when it is pivoted about its axis of rotation.

In addition, the mechanism 34 for articulation of the shelf 32 may be used no matter what type of rotation for the shelf is provided in the vehicle, especially when cords 66 exerting a force directed either forwards, rearwards, or both forwards or rearwards, actuate the shelf 32 during the movement of the tailgate 18.

As soon as the shelf 32 has begun to pivot, it is impossible to withdraw it from its articulation mechanism 34, whatever the direction of application of the force for moving the shelf.

The shelf 32 is in addition very easy to produce in a single step, being made in one piece, with different materials.

In addition, the mechanism 34 requires no major complication of the structure of the lateral sides 14 of the vehicle, taking into account the simplicity of the shape of the supports 30.

In addition, the fitting of the shelf 32 is facilitated, since the engagement of the shelf 32 in its articulation mechanism 34 is carried out substantially with the shelf in a horizontal position, thereby limiting interference with other elements of the body of the motor vehicle, such as the pillars.

Figure 6:
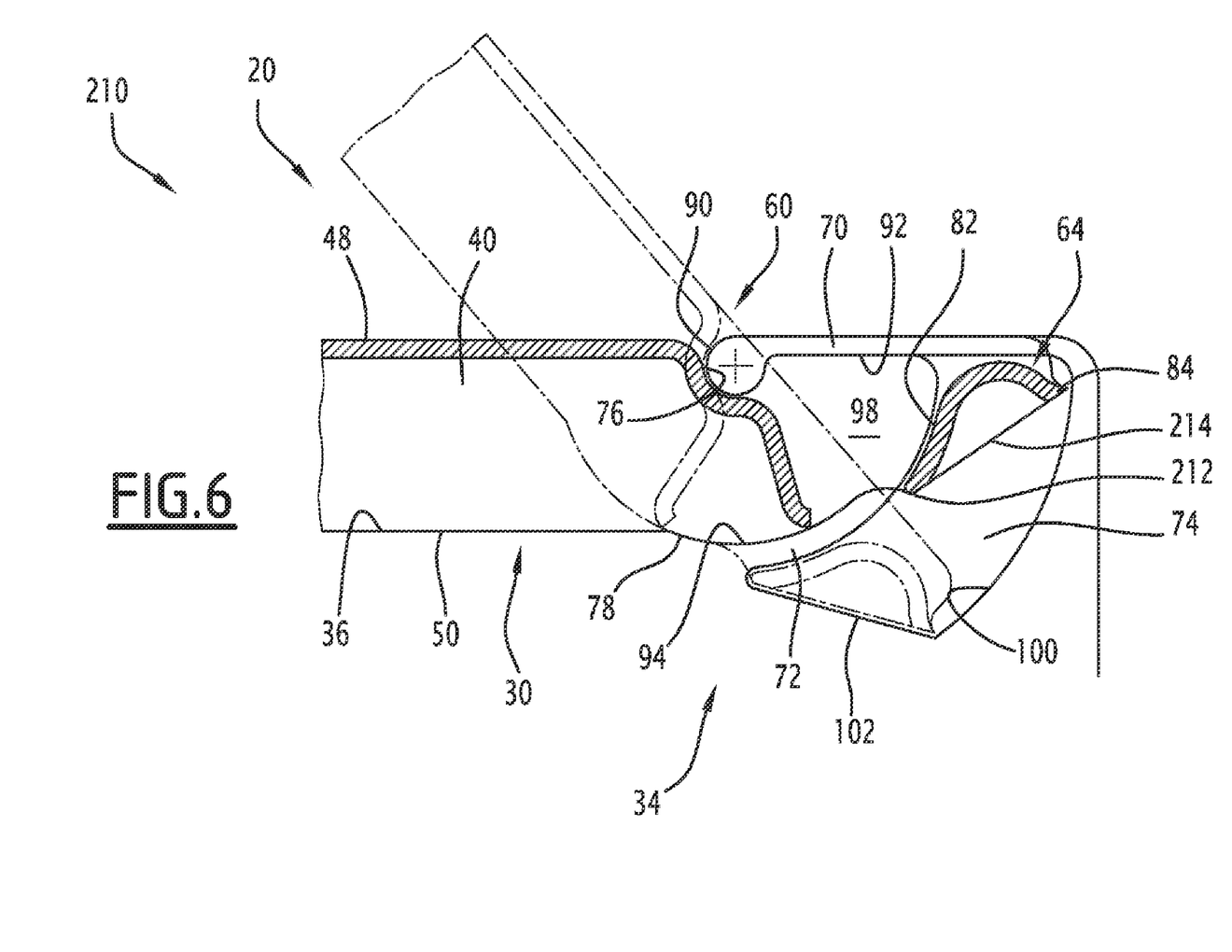
FIG. 6 is a view similar to FIG. 1 of a third rear assembly according to the invention.

A third assembly 210 according to the invention is illustrated in FIG. 6.

This assembly differs from the assembly 10 in that the ridge 84 is located above and to the rear of the lower edge 212 of the retaining surface 82 in the horizontal position of the shelf 32.

Thus, the projection 64 defines an inclined lower surface 214 between the lower edge 212 and the ridge 84, which extends entirely below a plane P' passing through the lower edge 212, the plane P' being inclined by an angle of more than 10° and less than 90° with respect to the median plane of the shelf 32. Similarly, the rear edge 42 of the shelf 32 is not perpendicular to the median plane of the shelf, but extends substantially in the inclined plane P'.

Thus, in this embodiment, penetration of the projection 64 into the lower compartment 52 is minimised, during the pivoting of the shelf 32 about the axis B-B', thereby increasing the available load volume. This maximum penetration is thus less than the average height of the body 42 of the shelf, viewed between the surfaces 48, 50.

In another variant, the maximum width of the projection 64, viewed transversely, is less than the width of the abutment surface 76, such that the projection 64 does not extend transversely as far as the lateral edge 46 of the shelf 32.

The invention claimed is:

1. A rear masking device (20) for a motor vehicle, comprising:
    supports (30) intended to be integral with the sides (14) of the motor vehicle;
    a shelf (32) rotatably mounted about a transverse axis (B-B') in the supports (30) between a substantially horizontal position disposed so as to bear on the supports (30) and an inclined limit of travel position;
    a mechanism (34) for articulation of the shelf (32) relative to the supports (30) comprising, for each support (30), at least one abutment surface (76) delimited by the shelf (32) and a complementary abutment surface (90) delimited by the support (30), the abutment surface (76) and the complementary abutment surface (90) being intended to slide on each other during the pivoting of the shelf (32) about its transverse axis (B-B') in order to prevent radial movement of the shelf (32) in a forward direction with respect to the transverse axis (B-B'), the abutment surface (76) and the complementary abutment surface (90) being located radially at a first distance from the transverse axis (B-B'),
    the mechanism (34) for articulation of the shelf (32) comprising a retaining surface (82) integral with the shelf (32) and a complementary retaining surface (96) defined by each support (30), the retaining surface (82) and the complementary retaining surface (96) being located radially at a second distance from the transverse axis (B-B') which is greater than the first distance,
    wherein
    the retaining surface (82) and the complementary retaining surface (96) co-operate for each inclined position of the shelf (32) between its substantially horizontal position and its inclined limit of travel position in order to prevent radial movement of the shelf (32) towards the rear with respect to the transverse axis (B-B'), and
    in the substantially horizontal position, the retaining surface (82) is disposed away from the complementary retaining surface (96) in order to permit radial movement of the shelf (32) towards the rear between a position engaged in each support (30) and a disengaged position away from the supports (30).

2. The device (20) according to claim 1, wherein the shelf (32) delimits a guide surface (78), having a curvature centered on the transverse axis (B-B'), each support (30) having a complementary guide surface (94) of a shape complementary to the guide surface (78), the guide surface (78) and the complementary guide surface (94) being located radially with respect to the transverse axis (B-B') between the complementary abutment surface (90) and the complementary retaining surface (6) in at least one inclined position of the shelf (32) between its horizontal position and its inclined limit of travel position.

3. The device (20) according to claim 1, wherein the mechanism (34) for articulation of the shelf (32) comprises, for each support (30), a retaining projection (64) integral with the shelf delimiting the retaining surface (82), the retaining projection (64) being received in a slide (74) delimited by each support (30), the slide (74) defining the complementary retaining surface (96).

4. The device (20) according to claim 3, wherein each support (30) delimits a pivot wall (70) defining the complementary abutment surface (94) and a guide wall (72) defining the complementary retaining surface (96), the guide wall (72) and the pivot wall (70) delimiting between them a substantially horizontal passage (98) for insertion of the projection (64) into the slide (74).

5. The device (20) according to claim 4, wherein the retaining surface (82) delimited on the projection (64) and the abutment surface (76) extend substantially opposite one another and define between them a notch (80) passing through the shelf (32) perpendicularly to the pivot axis (B-B'), the guide wall (72) being received in the notch (80) during the pivoting of the shelf (32) into each inclined position (72) between its horizontal position and its inclined limit of travel position.

6. The device (20) according to claim 4, wherein the guide wall is resiliently deformable in the slide (74) between a configuration for insertion of the shelf (32) into the articulation mechanism (34) and a configuration for holding the shelf (32) in the articulation mechanism (34).

7. The device (20) according to claim 3, wherein the projection (64) delimits, opposite from the retaining surface (82), a locking protuberance (84) intended to come into contact, in at least one given position between the horizontal position and the inclined limit of travel position, with a surface (100) defining the slide (74), in order to retain the shelf (32) in the given position.

8. The device (20) according to claim 3, wherein the projection (64) delimits a lower surface (214) located opposite to the retaining surface (82) and inclined at a non-zero angle less than 90° with respect to a median plane of the shelf (32), the median plane being substantially horizontal in the horizontal position of the shelf (32).

9. The device (20) according to claim 2, wherein the mechanism (34) for articulation of the shelf (32) comprises, for each support (30), a retaining projection (64) integral with the shelf delimiting the retaining surface (82), the retaining projection (64) being received in a slide (74) delimited by each support (30), the slide (74) defining the complementary retaining surface (96).

10. The device (20) according to claim 5, wherein the guide wall is resiliently deformable in the slide (74) between a configuration for insertion of the shelf (32) into the articulation mechanism (34) and a configuration for holding the shelf (32) in the articulation mechanism (34).

11. The device (20) according to claim 4, wherein the projection (64) delimits, opposite from the retaining surface (82), a locking protuberance (84) intended to come into contact, in at least one given position between the horizontal position and the inclined limit of travel position, with a surface (100) defining the slide (74), in order to retain the shelf (32) in the given position.

12. The device (20) according to claim 5, wherein the projection (64) delimits, opposite from the retaining surface (82), a locking protuberance (84) intended to come into contact, in at least one given position between the horizontal position and the inclined limit of travel position, with a surface (100) defining the slide (74), in order to retain the shelf (32) in the given position.

13. The device (20) according to claim 6, wherein the projection (64) delimits, opposite from the retaining surface (82), a locking protuberance (84) intended to come into contact, in at least one given position between the horizontal position and the inclined limit of travel position, with a surface (100) defining the slide (74), in order to retain the shelf (32) in the given position.

14. The device (20) according to claim 4, wherein the projection (64) delimits a lower surface (214) located opposite to the retaining surface (82) and inclined at a non-zero angle less than 90° with respect to a median plane of the shelf (32), the median plane being substantially horizontal in the horizontal position of the shelf (32).

15. The device (20) according to claim 5, wherein the projection (64) delimits a lower surface (214) located opposite to the retaining surface (82) and inclined at a non-zero angle less than 90° with respect to a median plane of the shelf (32), the median plane being substantially horizontal in the horizontal position of the shelf (32).

16. A rear assembly (10; 110, 210) for a motor vehicle, comprising:
   lateral sides (14) delimiting a boot (12);
   a movable tailgate (18) intended to close off the boot (12) towards the rear; and
   the masking device (20) according to claim 1, the supports (30) being integral with the lateral sides (14) of the motor vehicle.

17. The assembly (10) according to claim 16, wherein the tailgate (18) is pivotally mounted about a transverse tailgate axis relative to the sides (14) between a position in which the boot (12) is closed off and a position for access to the boot (12), at least one cord (66) connecting the tailgate (18) to the shelf (32) in order to pivot it between its horizontal position and its inclined limit of travel position during the opening of the tailgate (18), the or each cord (66) extending over at least a part of the travel of the tailgate (18) a force comprising a rearwardly directed component.

* * * * *